Oct. 21, 1958 E. A. FORBES 2,856,781
RECIPROCAL TO ROTARY CONVERTER
Filed Sept. 23, 1953 2 Sheets-Sheet 1

Edward A. Forbes
INVENTOR.

Oct. 21, 1958
E. A. FORBES
2,856,781
RECIPROCAL TO ROTARY CONVERTER
Filed Sept. 23, 1953
2 Sheets-Sheet 2
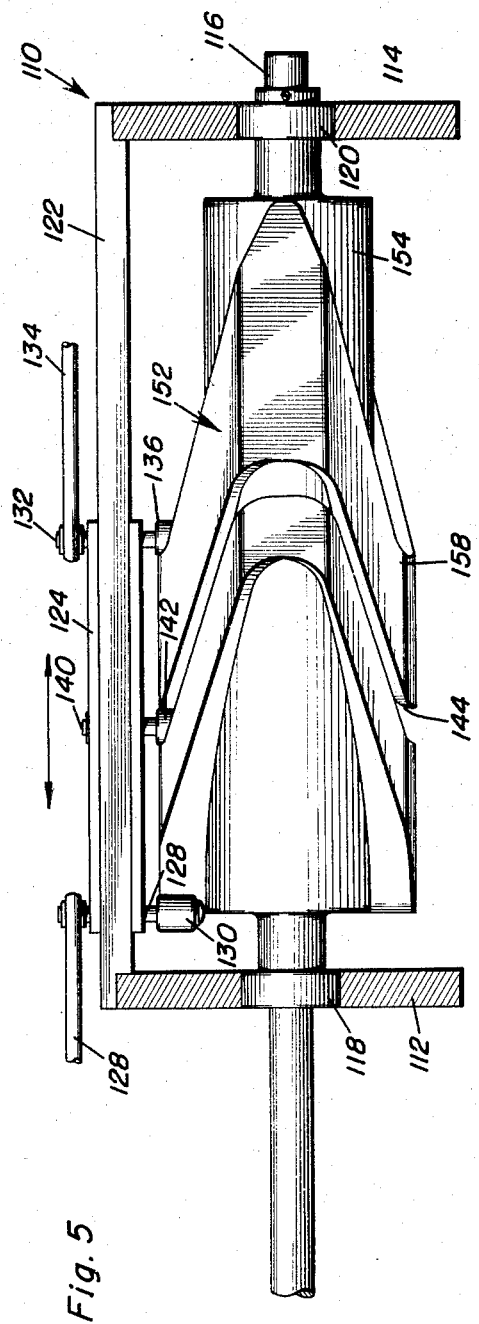
Fig. 5
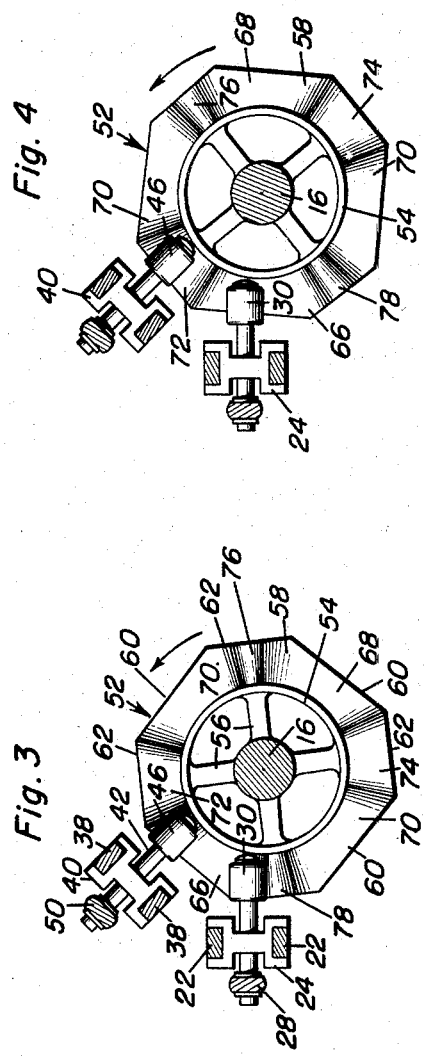
Fig. 4
Fig. 3
Edward A. Forbes
INVENTOR.
BY *Clarence A. O'Brien
and Harvey B. Jacobson*
Attorneys 2,856,781

RECIPROCAL TO ROTARY CONVERTER

Edward A. Forbes, West Palm Beach, Fla.

Application September 23, 1953, Serial No. 381,864

2 Claims. (Cl. 74—56)

This invention relates in general to improvements in devices for converting reciprocal motion to rotary motion, and more specifically to a system of inclined planes so constructed in a component hereinafter referred to as a cam member and so designed that reciprocating motion may be converted to rotary motion with a minimum of power loss and wear upon the part of the contacting surfaces.

At the present time, there are in universal use many types of reciprocating engines of which a great majority rely upon crankshafts for the converting of reciprocal motion of the pistons into rotary motion imparted to a drive shaft. It is well known that the utilization of a crankshaft is an extremely inefficient method of converting reciprocal motion to rotary motion inasmuch as the maximum effective lever arm of the force applied to the crankshaft from the piston is obtained only at the midpoint of the stroke and is greatly reduced on both sides thereof.

Numerous attempts have been made to provide a suitable cam mechanism which would convert reciprocal motion to rotary motion. The early patent to Campbell, Patent No. 324,445 dated August 18, 1885, is a good example of the type of cam devices attempted. While it is true that the cam device of Campbell will convert reciprocal motion to rotary motion with a minimum of power loss, a serious defect arises due to the fact that in rotating this cam member, the bottom and top sides of the groove travel different diameters and at different rates of speed, therefore, a roller on these convex surfaces cannot have a true rolling action but must in some degree slide, wipe or scuff, inducing rapid and excessive wear on the contact surfaces nullifying the feasibility of the device.

The object of this invention is to convert reciprocal motion to rotary motion for the transmission of power more efficiently than is possible when using a crankshaft for this purpose. It is necessary, therefore, to provide a cam member with a roller engageable cam surface or roller path of such a nature that scuffing action between the roller and cam during the effective power stroke of the roller is eliminated.

A further object of this invention is to provide a cam member for the conversion of reciprocal to rotary motion which includes a roller engageable cam surface having its maximum lever arm in the form of elongated straight portions tangent with relatively short arcuate portions for reversing a reciprocal stroke. These straight portions have roller engaging paths with no variation in distance or speed during rotation and upon which rollers on the power stroke can roll true with maximum pressure and on the maximum lever arm without scuffing.

Advantages of the device include: absence of vibration; absence of side thrust on pistons which travel straight back and forth with no oscillation; broad limits on length of power strokes and lever arms are inherent in the cam member design; no limit on the diameter of the drive shaft on which the cam member may be mounted or integral; feasibility of using anti-friction bearings exclusively throughout; simplicity and economy of manufacture; more torque per unit of pressure on pistons than possible with crankshafts.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top plan view of the converter which is the subject of this invention and shows the relationship of reciprocating rollers with respect to a cam member carried by a shaft for converting the reciprocatory motion of the rollers into rotary motion of said shaft, a cross-head for one pair of rollers being omitted for purposes of clarity, one set of rollers being illustrated at the beginning of the power stroke and the other set of rollers being illustrated at a midpoint of its power stroke;

Figure 3 is a transverse vertical sectional view taken substantially upon the plane indicated by the section line 3—3 of Figure 1 and shows the relationship of the rollers with respect to the cam surfaces of the cam member, also being illustrated is the cross-section of the cam member;

Figure 4 is a transverse vertical sectional view taken substantially upon the plane indicated by the section line 4—4 of Figure 2 and shows the cam member in its rotated position; and Figure 5 is a top plan view of a converter utilizing a modified form of cam member.

Figures 1, 2:
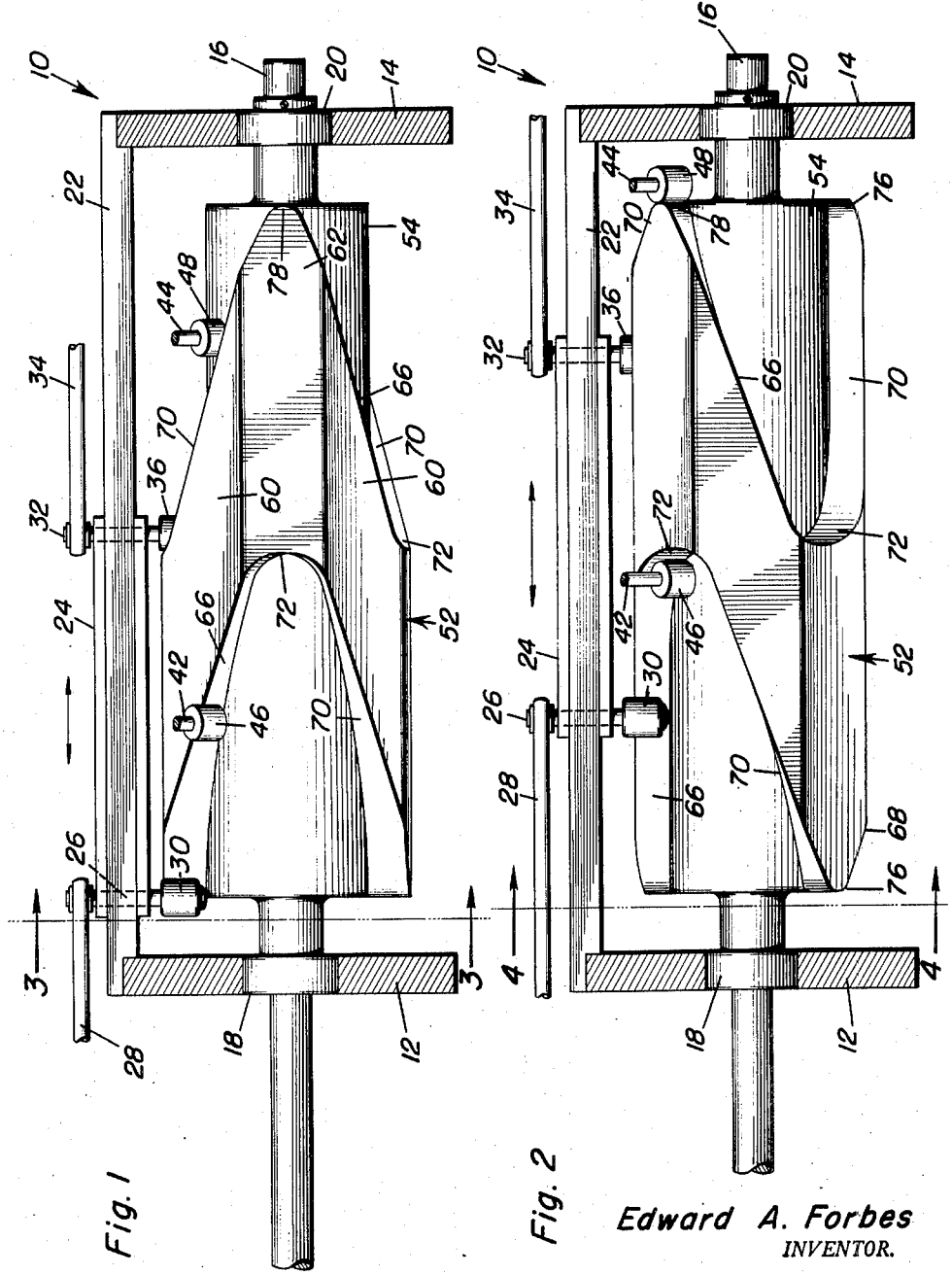
Figure 2 is a top plan view similar to Figure 1 and shows the first set of rollers at the midpoint of their power stroke and the second set of rollers at the end of their power stroke.

Referring now to the drawings in detail, it will be seen that there is illustrated in Figures 1 through 4, inclusive, a preferred form of converter for converting reciprocatory motion to rotary motion, the converter being referred to in general by the reference numeral 10. The converter 10 includes a pair of spaced frame members 12 and 14 which may be of any desired construction and which are intended primarily for the supporting of an elongated rotatable drive shaft 16. The drive shaft 16 is rotatably journaled in bearings 18 and 20 carried by the frame members 12 and 14, respectively. It will be understood that the bearings 18 and 20 may be of any desired type and that their design will depend upon the particular installation.

Extending between and supported by the frame members 12 and 14 is a first pair of guide rails 22. The guide rails 22 have mounted therebetween for longitudinal reciprocatory movement a cross-head 24. Although the guide rails 22 have been described as being supported by the frame members 12 and 14, it will be understood that they may be suitably supported in any manner desired.

Carried by the cross-head 24 adjacent the end thereof disposed adjacent the frame member 12 is a transversely extending shaft 26 which has connected on one end thereof remote from the drive shaft 16 one end of a connecting rod 28. The other end of the connecting rod 28 (not shown) is connected to a reciprocating piston (not shown). The end of the shaft 26 disposed adjacent the drive shaft 16 has mounted thereon a roller 30. The roller 30 is suitably journaled on the shaft 26 in any desired manner and is rotatable about the shaft 26.

Carried by the end of the cross-head 24 adjacent the frame member 14 is a second transverse shaft 32. The transverse shaft 32 has pivotally connected to the end thereof remote from the drive shaft 16 one end of a second connecting rod 34. The connecting rod 34 has its opposite end (not shown) connected to a reciprocating piston (not shown). Suitably journaled on the other end of the shaft 32, which is adjacent the drive shaft 16, is a second roller 36. It will be understood that the rollers 30 and 36 are to be considered drive rollers.

Also extending between and carried by the frame members 12 and 14 is a second pair of guide rails 38. The guide rails 38 have been rotated 45° from the guide rails 22, and are otherwise identical in structure. Carried by the guide rails 38 for guided reciprocatory motion is a cross-head 40. The cross-head 40 is identical with the cross-head 24 and is provided with a pair of transverse shafts 42 and 44. Suitably journaled on the ends of the shafts 42 and 44 adjacent the drive shaft 16 are drive rollers 46 and 48, respectively. Connected to the end of the shaft 42 remote from the drive shaft 16 is a connecting rod 50. A similar connecting rod (not shown) is connected to the end of the shaft 44 remote from the drive shaft 16. It will be understood that the connecting rods connected to the shafts 42 and 44 are connected to pistons (not shown) in the same manner as the connecting rods 28 and 34.

While only two cross-heads have been illustrated, the balanced relationship would be to provide a total of eight cross-heads, each cross-head being space circumferentially 45° from its adjacent cross-head. However, the cross-head arrangement illustrated will permit the operation of the converter 10.

Carried by the drive shaft 16 intermediate the frame members 12 and 14 for rotation with the drive shaft 16 is a cam member which is referred to in general by the reference numeral 52. The cam member 52 includes a cylindrical center 54 which is connected to the drive shaft 16 by a plurality of spiders 56. Carried by the center 54 is a cam element 58.

It will be noted that the cam element 58 is octagonal in cross-section and includes alternating sides 60 which are of greater width than other alternating sides 62, there being one side 62 between each adjacent pair of The ends of the cam element 58 are of identical configurations and form cam surfaces engaged by the rollers 30, 36, 46 and 48. Each cam surface includes an elongated straight cam portion 66 which is formed in one of the straight sides 60. An identical cam portion 68 is disposed 180° from the cam portion 66. As viewed in Figure 1, the cam surfaces 66 slope inwardly towards the center of the drive shaft 16 from the left so that when a roller moving to the right engages such cam portion, the cam member 52 and the drive shaft will move in a counter-clockwise direction, as viewed along the section line 3—3 of Figure 1.

Each cam surface also includes elongated straight cam portions 70 which are disposed intermediate the cam portions 66 and 68. As viewed in Figure 1, each cam portion 70 slopes outwardly to the left from the center of the drive shaft 16.

It will be noted that the cam portion 70 disposed intermediate the cam portions 66 and the cam portions 68, as viewed in a clockwise direction in Figure 3, is connected to the cam portion 66 by a concave arcuate portion 72. The other cam portion 70 is connected to the cam portion 68 by a similar arcuate portion 74. The first mentioned straight cam portion 70 is connected to the straight cam portion 68 by a relatively short convex arcuate portion 76 and the second mentioned straight cam portion 70 is connected to the straight cam portion 66 by a similar convex arcuate portion 78.

By making the cam member 52 polygonal in cross-section with each of the straight cam portions being formed in a single side of the cam member, it is possible to have straight cam portions, such as the cam portions 66, 68 and 70. The straight cam portions twist transversely of their longitudinal axes throughout their length so that the lines of contacts between the various rollers and their associated straight cam portions remain of full width and constant. Further, the relationship of the rollers and their straight cam portions is such that the path traveled by any point along a roller is of equal length as compared to the path of travel of any other point along such roller. In other words, the relationship of any one of the numerous rollers with respect to its associated straight cam portion is the same as a similar roller rolling along a flat surface. Inasmuch as the rate of travel of all points along each roller is the same, it will be seen that there is no tendency for any point of the roller to slip relative to the straight cam portion and thereby, a wiping or scuffing action is eliminated along the straight cam portions. It will be noted that the portion of one of the cam surfaces are rotated 90° with respect to the similar portions of the other cam surfaces. Thus, when the roller 30 is in engagement with the straight cam portion 66, its companion roller 36 is in engagement with one of the straight cam portions 70. It will be seen that the relationship of the roller 30 and 36 with respect to the two cam surfaces of the cam member 52 is such that when the cross-head 24 is moved to the right, as viewed in Figure 1, the roller 30 only exerts a force upon the cam member 52. However, when the cross-head 24 reaches the end of its stroke to the right and reverses directions so as to move to the left, the roller 36 then engages its associated cam surface and applies force to the cam member 52. It will thus be seen that only the straight cam portions 66 and 68 of each cam surface receive thrust from the rollers 30 and 36, and that the straight cam portions 70 are provided only to guide the rollers 36 and 30 during their no-force strokes. It will be understood that the relationship of the cam surfaces with respect to the rollers 46 and 48 is the same.

The converter 10 is intended to be primarily utilized with steam engines. Inasmuch as the thrust exerted by a piston of a steam engine during a power stroke remains constant throughout the stroke, and since the effective length of the power stroke of a steam engine may be varied by conventional valving in a manner which is well known and need not be described in detail here, it will be seen that the power strokes of the pistons connected to the connecting rods 28 and 34 may be so timed so that they coincide with the engagement of the rollers 30 and 36 with their respective straight cam portions 66 and 68. In this manner, the rollers 30 and 36 will engage the cam surfaces of the cam member 52 during a power stroke only when the rollers 30 and 36 are so engaged with such cam surfaces so as not to produce a scuffing or other wearing action on either the cam surfaces or the rollers. It will be understood that the relationship of the rollers 46 and 48 with the cam surfaces will be identical.

As is best illustrated in Figures 3 and 4, the axes of the shafts supporting the rollers are offset in a direction opposite from the rotation of the cam member 52 from the longitudinal axis of the drive shaft 16. By so offsetting the axes of the supporting shafts for the rollers, the lines of contacts between the rollers and the various cam portions will remain normal to and in intersecting relation with the longitudinal axis of the drive shaft 16. Not only does this eliminate scuffing, but also prevents the accidental reversing of the direction of rotation of the drive shaft 16.

Referring now to Figure 5 in particular, it will be seen that there is illustrated a modified form of converter which is referred to in general by the reference numeral 110. The converter 110 is quite similar in construction to the converter 10 inasmuch as it includes a pair of spaced frame members 112 and 114 which support for rotation a drive shaft 116 through the use of suitable bearings 118 and 120.

The converter 110 also includes a pair of spaced guide rails 122 which extend between the frame members 112 and 114 and are supported thereby. Guidingly supported by the guide rails 122 for reciprocatory motion is a cross-head 124. The cross-head 124 has transverse shafts 126 and 132 carried at opposite ends thereof on which are mounted for rotation drive rollers 130 and 136, respectively. Connected to the shafts 126 and 132 are connecting rods 128 and 134 which are in turn connected to driving pistons (not shown).

Mounted on the drive shaft 116 for rotation therewith is a cam member 152 which includes a core 154 which has carried thereby a cam element 158. The cam element 158 is of identical cross-section with the cam element 58 and has cam surfaces at opposite ends thereof engaged by the rollers 130 and 136 in the same relation as mentioned above relative to the cam element 58.

The converter 110 differs from the converter 10 inasmuch as the cross-head 124 is provided intermediate its ends with a third shaft 140 which has rotatably journaled thereon a third drive roller 142. Formed in the exterior surface of the cam element 158 is a cam groove 144. The cam groove 144 is of the same outline as the cam surfaces at the end of the cam element 158 and is engaged by the drive roller 142.

It will be understood that in many instances, a single pair of drive rollers will be insufficient to transmit the power from a pair of pistons to the cam member 152. Thus, by providing one or more intermediate cam grooves in which are drivingly engaged additional rollers, the contact pressures between the rollers and the cam surfaces may be reduced.

Although the converter has been described specifically for use with a steam engine, it will be understood that it is not so limited. If so desired, the converter may be utilized in combination with compressed air and water engines as well as diesel engines.

In view of the foregoing, it will be seen that there has been illustrated and described a converter utilizing a cam member and drive rollers for converting reciprocatory motion to rotary motion which is feasible. The converter of this invention eliminates all scuffing action during the power strokes of the drive rollers and therefore is not subject to excessive wear.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A motion converter for converting reciprocatory motion to rotary motion comprising a cross-head mounted for reciprocatory movement, a rotatable shaft, a cam member carried by said shaft for rotation therewith, at least one cam engaging roller carried by said cross-head in driving engagement with said cam member, said cam member being provided with elongated straight roller engaging cam surfaces connected by relatively short arcuate cam surfaces, said roller having an axis normal to a parallel offset of the axis of said shaft whereby sliding of said roller relative to said cam surfaces during an effective power stroke of said roller is eliminated.

2. A motion converter for converting reciprocatory motion to rotary motion comprising a cross-head mounted for reciprocatory movement, a rotatable shaft, a cam member carried by said shaft for rotation therewith, at least one cam engaging roller carried by said cross-head in driving engagement with said cam member, said cam member being provided with elongated straight roller engaging cam surfaces connected by relatively short arcuate cam surfaces, said roller engaging said straight cam surfaces in a line contact, the line of contact between said roller and said straight cam surfaces being normal to and intersecting the axis of said shaft whereby sliding of said roller relative to said cam surfaces during an effective power stroke of said roller is eliminated.

References Cited in the file of this patent

UNITED STATES PATENTS

| | | |
|---|---|---|
| 1,181,463 | La Fontaine | May 2, 1916 |
| 1,339,276 | Murphy | May 4, 1920 |
| 1,762,437 | Franklin | June 10, 1930 |
| 2,045,599 | Holmes | June 30, 1936 |
| 2,243,821 | Herrmann | May 27, 1941 |
| 2,451,374 | Bell | Oct. 12, 1948 |
| 2,579,642 | Bachman | Dec. 25, 1951 |

FOREIGN PATENTS

| | | |
|---|---|---|
| 2,807 | Great Britain | Oct. 31, 1865 |